United States Patent [19]
Spentzas

[11] 3,931,554
[45] Jan. 6, 1976

[54] RECIPROCATING MOTOR-COMPRESSOR SYSTEM

[76] Inventor: Nikolaos E. Spentzas, 594 Rozanne Drive, Addison, Ill. 60101

[22] Filed: Aug. 13, 1974

[21] Appl. No.: 496,936

[52] U.S. Cl. ................. 318/122; 310/30; 417/417; 417/418; 318/125
[51] Int. Cl.² ........................................ H02K 33/12
[58] Field of Search ............ 417/417, 418; 318/119, 318/122, 121, 123, 124, 125, 127, 130, 132, 133, 134; 310/30, 34, 35, 15, 27, 33, 28, 23, 24

[56] References Cited
UNITED STATES PATENTS

| | | | |
|---|---|---|---|
| 1,912,167 | 5/1933 | Anderson | 318/123 X |
| 2,003,647 | 6/1935 | Dillström | 318/122 X |
| 2,690,128 | 9/1954 | Basilewsky | 318/122 X |
| 3,118,383 | 1/1964 | Woodward | 318/130 X |
| 3,134,938 | 5/1964 | Morgan | 310/30 X |
| 3,162,134 | 12/1964 | Lovell | 318/125 X |
| 3,196,797 | 7/1965 | Marini | 318/125 X |
| 3,201,670 | 8/1965 | Myers | 318/125 |
| 3,328,656 | 6/1967 | Dotson | 318/130 X |
| 3,846,682 | 11/1974 | Massie | 318/134 X |

FOREIGN PATENTS OR APPLICATIONS

| | | | |
|---|---|---|---|
| 553,206 | 5/1943 | United Kingdom | 318/121 |

*Primary Examiner*—Donovan F. Duggan
*Attorney, Agent, or Firm*—Mason, Kolehmainen, Rathburn & Wyss

[57] ABSTRACT

A reciprocating motor compressor assembly includes a pair of opposed pistons or diaphragms actuated by a reciprocating armature. The armature is fabricated from laminations of ferromagnetic material and includes a pair of electrically conductive induction rings disposed about the ends of the laminations in coaxial relationship with a longitudinal axis of the armature. A two coil stator is disposed in coaxial relationship with the armature and the coils are alternately energized by a multivibrator or a pair of oppositely poled half wave rectifiers connected to a source of alternating current voltage. In order to increase the duty cycle of the energizing current, each stator coil is provided with two coaxially wound parallel connected windings and a phase shifting capacitor connected in series with one of the windings.

18 Claims, 9 Drawing Figures

RECIPROCATING MOTOR-COMPRESSOR SYSTEM

BACKGROUND OF THE INVENTION

This invention relates generally to pumps and compressors, and more particularly, to electrically powered pumps and compressors of the reciprocating type.

Present day pumps and compressors are generally comprised of two basic types. These two basic types may be divided into rotary and reciprocating types. The rotary types comprise strictly rotary compressors such as gear pumps and impeller pumps, and the more common types wherein a crank shaft is employed to convert the rotary motion into reciprocating motion. The reciprocating types generally employ a linear motor having a two coil stator and an armature, and a pair of opposed pistons attached to the armature. The armature may be fabricated from a magnetic material, or may be a wire wound type. When a wire wound armature is used, the armature is engergized with alternating current, and when a magnetic armature is used, the stator coils ar alternately energized with direct current by means of a switch mechanically coupled to the armature.

While a large variety of pumps and compressors may be provided utilizing the conventional rotary and reciprocating techniques, pumps employing rotary techniques tend to have a large number of moving parts and hence, tend to be relatively costly and require periodic maintenance. Prior art pumps and compressors of the reciprocating type, while being less complex than rotary type pumps, tend to be inefficient in operation and limited in power.

SUMMARY OF THE INVENTION

Accordingly, it is an object of the present invention to provide a new and improved reciprocating compressor.

A further object of the present invention is to provide an improved reciprocating compressor that is more efficient and more powerful than reciprocating compressors of the prior art.

Yet another object of the present invention is to provide a self-contained compressor useable for refrigeration purposes.

Another object of the present invention is to provide a compact, low cost reciprocating structure useable as a compressor or a pump.

In accordance with a preferred embodiment of the invention, an elongated reciprocating armature having a pair of conductive induction rings at opposite ends thereof is fabricated from laminations of ferromagnetic material. A pair of opposed pistons or diaphragms are attached to the ends of the elongated armature by a rod made from nonmagnetic material. A pair of stator coils are disposed in coaxial relationship about the armature, and a laminated magnetic structure is employed to complete a magnetic path between the stator coils and the armature. A two piece housing, split along a longitudinal axis, is provided for supporting the stator coils and the magnetic structure. The armature is supported in coaxial relationship with the stator coils by the pistons or diaphragms which are supported at opposite ends of the housing.

The stator coils are alternately energized on alternate cycles of an alternating current wave applied thereto. The energizing current is applied to the stator coils by means of a pair of oppositely poled half wave rectifier diodes, each rectifier diode being connected to a source of alternating current voltage and to one of the stator coils. Alternatively, a switching circuit such as a flip-flop may be connected to a source of direct current voltage and to each of the stator coils to alternately provide energizing current thereto.

When the half wave rectifier diodes are used to energize the stator coils, each stator coil is provided with two windings, one winding being connected directly in series with one of the rectifier diodes and the other winding being connected in series with the same rectifier diode and a phase shifting capacitor. The phase shifting capacitor shifts the phase of the current flowing through one of the windings to increase the duty cycle of the energizing current flowing through each stator coil to increase the mechanical output power available from the reciprocating armature. The conductive induction rings disposed about the ends of the armature further increase the mechanical output power by generating a magnetic field that reacts with the field produced by the stator coils to increase the magnetic force available to move the armature.

DESCRIPTION OF THE DRAWING

The invention, and its method of operation, together with further objects and advantages thereof, will best be understood by reference to the following specification taken in connection with the accompanying drawing in which.

DETAILED DESCRIPTION

A. General

Figure 1:
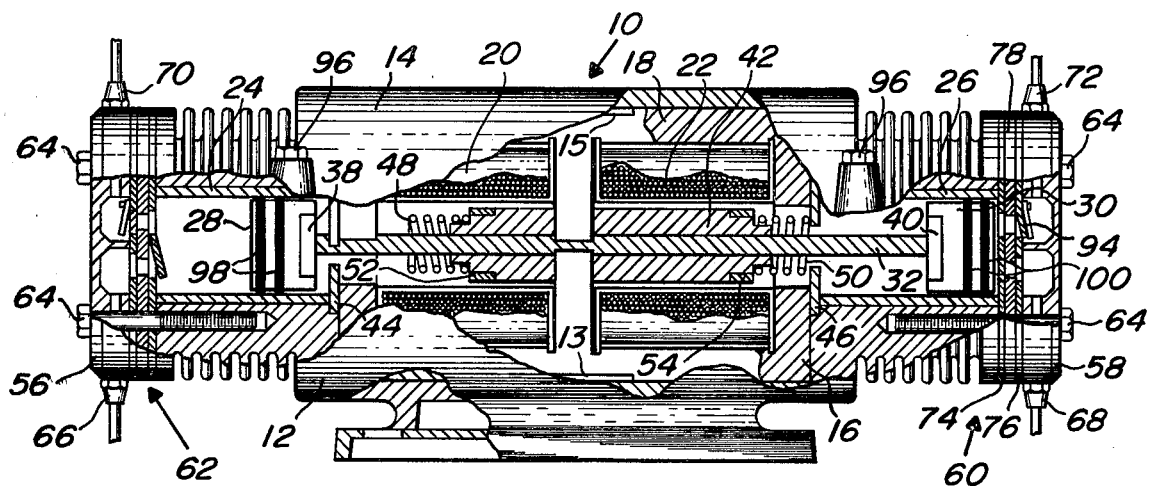
FIG. 1 is a side view, partially in cross section, showing a self-contained opposed piston reciprocating compressor according to the invention.
Figure 4:
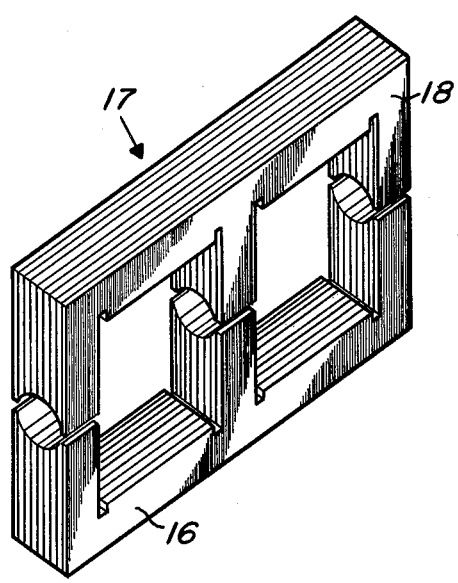
FIG. 4 is a perspective view showing the laminated magnetic structure for use with the compressor or pump of FIGS. 1 and 2.
Figure 5:
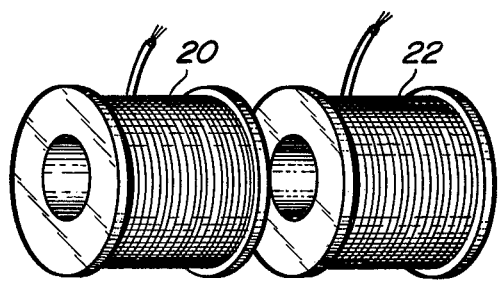
FIG. 5 is a perspective view of the stator windings for use with the compressor or pump of FIGS. 1 and 2.

Referring now to the drawing, with particular reference to FIG. 1, there is shown a compressor unit generally designated as 10 constructed in accordance with the principles of the present invention. The compressor 10 includes a two piece housing having a base portion 12 and an upper portion 14. A channel 13 is provided in the base portion 12 for supporting a lower member 16 of a laminated magnetic structure 17 (FIG. 4). An upper member 18 of the magnetic structure 17 is supported in a similar channel 15 in the upper portion 14 of the housing. Two stator coils 20 and 22 are supported by the magnetic structure members 16 and 18. A pair of cylinder liners 24 and 26 are supported by the housing portions 12 and 14 and serve to support a pair of opposed pistons 28 and 30. The opposed pistons 28 and 30 are connected together by a nonmagnetic shaft 32. The pistons 28 and 30 may be attached to the shaft 32 by means of threads 34 and 36 (FIG. 5) or any other suitable mounting method. If threads are employed to secure the pistons 28 and 30 to the shaft 32, a pair of flats 38 and 40 (FIG. 1) may be relieved in the skirts of the pistons 28 and 30 to provide gripping surfaces for tightening the pistons onto the shaft 32.

A laminated armature 42 is attached to the shaft 32. The armature 42 is supported in coaxial relationship with the stator coils 20 and 22 by the pistons 28 and 30, and requires no bearings or other supporting structure. Two armature travel limiting washers 44 and 46 are supported by the two housing portions 12 and 14, and serve to limit the maximum travel of the armature 42. A pair of shock absorbing springs 48 and 50 are attached to the ends of the armature 42 and serve to cushion the impact between the armature 42 and the limiting washers 44 and 46. A pair of conductive induction rings 52 and 54 (FIG. 6), fabricated from a conductive nonmagnetic material such as copper, are affixed to opposite ends of the armature 42. The function of the induction rings will be described in a subsequent portion of the specification.

Two cylinder heads 56 and 58 are disposed at opposite ends of the compressor unit 10. A valve mechanism 60 is interposed between the cylinder head 58 and the housing portions 12 and 14. A similar valve mechanism 62 is interposed between the head 56 and the opposite ends of the housing portions 12 and 14. Each of the heads 56 and 58 is affixed to the housing portions 12 and 14 by means of four bolts 64. Inlet 66 and 68 and outlets 70 and 72 are attached to the heads 56 and 58, respectively.

Figure 3:
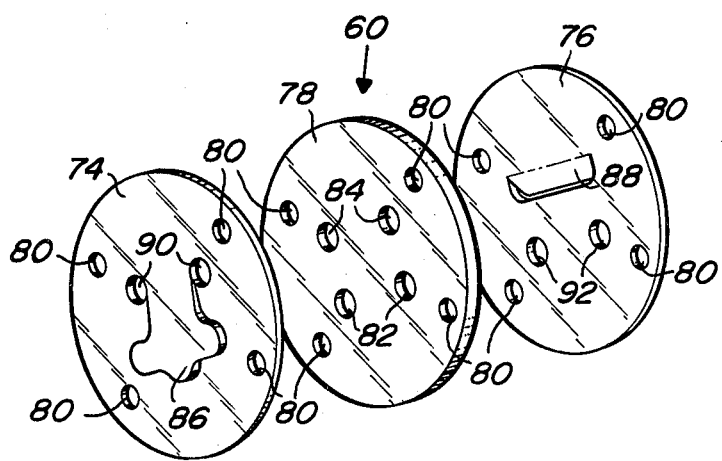
FIG. 3 is an exploded perspective view of a valve assembly for use with the compressor of FIG. 1.

A more detailed drawing of the valve mechanism 60 is shown in FIG. 3. The valve mechanism 60 comprises a pair of reed valves 74 and 76. A spacer plate 78 is interposed between the reed valves 74 and 76. The reed valves 74 and 76 and the spacer plate 78 each have four holes 80 for receiving the four bolts 64. The spacer 78 also has a pair of inlet holes 82 and a pair of outlet holes 84. A reed 86 is formed in the valve 74 and a reed 88 is formed in the valve 76. A pair of apertures 90 are formed in the valve 74 in alignment with the outlet holes 84. Similarly, a pair of apertures 92 are formed in the valve 76 in alignment with the inlet holes 82.

In operation, as the piston 30 (FIG. 1) is moved away from the cylinder head 58, the vacuum created in the cylinder deflects the reed 86 away from the inlet holes 82 to allow fluid in the form of liquid or a gas from the inlet 68 to enter the cylinder through the apertures 82 and 92 in the valve mechanism 60. Simultaneously, the reed 88 is drawn against the spacer 78 and covers the holes 84 to prevent fluid from leaking into the cylinder from the outlet 72. As the piston is moved toward the cylinder head during the following stroke, the pressure build up in the cylinder causes the reed 86 to be pressed against the plate 78 to seal the holes 82, while simultaneously the reed 88 is deflected away from the spacer 78 to allow the fluid to pass through the holes 90 and 84 and into the outlet 72. Because of the high pressure generated during the compression stroke of the piston 30, a travel limiting member 94 is provided adjacent the reed 88 to prevent excessive travel and possible damage to the reed 88. Operation of the valve mechanism 62 is similar to that of the mechanism 60 and need not be discussed in detail.

The reciprocating compressor unit 10 has been designed for ease of assembly. In order to assemble the unit, the lower magnetic structure member 16 is first placed in the channel 13 of the base portion 12 of the housing. The spring 48 and 50, the limiting washers 44 and 46, and the stator coils 20 and 22 are then placed over the armature 42 and the shaft 32. The pistons 28 and 30 are affixed to the shaft 32 and the cylinder liners 24 and 26 are placed over the pistons 28 and 30, respectively. The assembly thus prepared is then placed into the base portion 12 of the housing, and the coils, cylinder liners and limiting washers are aligned with recesses in the base portion 12 provided to receive these components. The upper magnetic structure member 18 is then placed in the upper portion 14 of the housing and the two housing portions 12 and 14 are secured by means of four bolts 96 which pass through the upper portion of the housing 15 and into threaded holes (not shown) in the base portion 12. Finally, the valve assemblies 60 and 62, and the heads 56 and 58 are secured to the two halves of the housing by the bolts 64.

The assembled unit is completely self-contained and has no surfaces moving with respect to each other except for the pistons 28 and 30 moving within the cylinder liners 24 and 26. To reduce friction and provide an adequate seal between the pistons and the cylinder liners, two pairs of piston rings 98 and 100 are carried by the pistons 28 and 30, respectively. The piston rings 98 and 100 may be made of a self-lubricating material such as carbon or an oil impregnated metallic substance, to eliminate the need for any lubrication during the life of the compressor unit.

Figure 2:
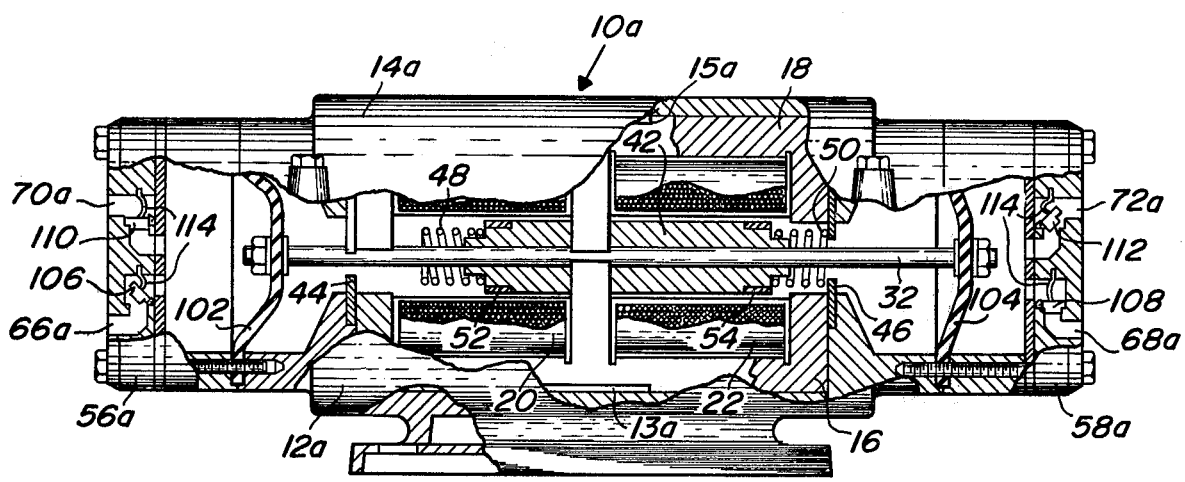
FIG. 2 is a side view, partially in cross section, of a self-contained reciprocating opposed diaphragm pump according to the invention.

The compressor unit 10 described in the foregoing utilizes opposed pistons to pump high pressure fluids such as Freon and other substances used in air conditioning applications. The same priniciples may be employed to pump fluids at low pressure, and when low pressure fluids are being pumped, the pistons 28 and 30 of FIG. 1 may be replaced by a pair of diaphragms 102 and 104 (FIG. 2). FIG. 2 shows a typical low pressure pump 10a employing the same driving mechanism used to drive the compressor unit 10 of FIG. 1. Accordingly, for purposes of clarity, whenever the same components are used in the apparatus of FIG. 1 and FIG. 2, they will be designated by the same reference numeral, and similar components serving an analagous function will be designated by the same reference numeral followed by the suffix a. Thus, the housing portions 12a and 14a (FIG. 2) are analagous to the housing portions 12 and 14 (FIG. 1), but have been modified to accept a pair of diaphragms 102 and 104 rather than the cylinder liners 24 and 26. The heads 56a and 58a are analagous to the heads 56 and 58, respectively, the main difference being the use of low pressure valves 106, 108, 110 and 112 in place of the reed valve mechanisms 60 and 62.

The intake valves 106 and 108 are pivotally mounted over a pair of inlets 66a and 68a in the heads 56a and 58a, respectively. Each of the intake valves 106 and 108 is pivoted such that it is opened by the decrease in pressure occurring when the respective one of the diaphragms 102 and 104 is moved away from the head, and closed by the increase in pressure occuring when the diaphragm is moved toward the head. A pair of outlet valves 110 and 112 is mounted in the heads 56a and 58a and hinged in the opposite direction in order to open when the pressure in the diaphragm chamber increases and close when the pressure in the diaphragm chamber decreases. Although the valves 106, 108, 110 and 112 are self-actuating, due to the high speed of operation of the pump 10a, in a preferred embodiment, a set of springs 114 is employed to bias the valves in a closed position to assure that the valves are properly closed after each stroke.

B. Reciprocating Motor

FIG. 4 shows the magnetic structure members 16 and 18 in greater detail. The members 16 and 18 are fabricated from E-shaped laminations of magnetic material. The E-shaped laminations are insulated from each other to reduce eddy currents and the three pole pieces extending from the E have curved surfaces to conform to the curvature of the armature 42. The curved surfaces are formed by varying the lengths of the laminations forming the pole pieces.

The stator coils 20 and 22 (FIG. 5) are wound around a pair of bobbins having radially extending flanges. The magnetic structure 17 is provided with a series of notches adjacent to the pole pieces to receive the flanges of the bobbins to secure the stator coils 20 and 22 in place. Each of the stator coils 20 and 22 may contain a single winding or a plurality of windings. The considerations for determining whether one or a plurality of windings will be used will be discussed in a subsequent portion of the specification.

Figure 6:
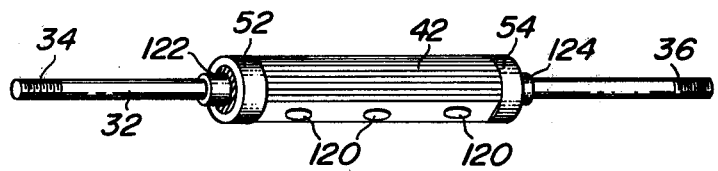
FIG. 6 is a perspective view of the laminated armature for use with the compressor and pump of FIGS. 1 and 2 showing a pair of conductive induction rings affixed to the ends of the armature.
Figure 7:
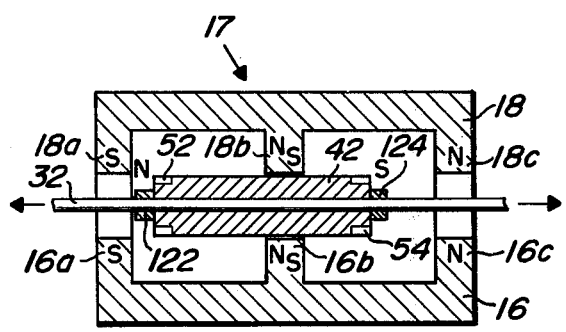
FIG. 7 is a simplified diagram of the magnetic structure and armature of the reciprocating motor used in the compressor and pump of FIGS. 1 and 2.

FIG. 6 shows the armature 42 in greater detail. The armature is fabricated from laminations of ferromagnetic material which may be held together by a set of rivets 120. The conductive induction rings 52 and 54 are affixed to the ends of the armature 42 by means of a press fit. Alternatively, rivets or other methods may be employed to affix the induction rings to the armature. Two collars 122 and 124 extend from opposite ends of the armature 42 and serve to retain the springs 48 and 50 (FIG. 4) in place. The collars 122 and 124 may be separately fabricated from tube stock as shown in FIGS. 6 and 7, or may be formed by extensions of the laminations forming the armature 42 as shown in FIGS. 1 and 2. The threaded portions 34 and 36 of the shaft 32 are used to secure the pistons or diaphragms in place, however, other securing methods may be used.

Figure 8:
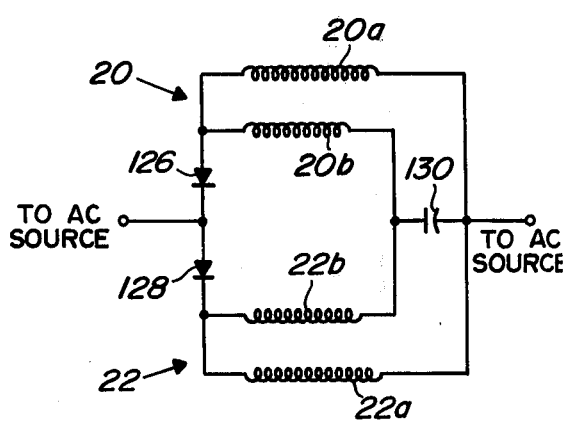
FIG. 8 is a schematic circuit diagram of the energizing circuit for the stator coils of FIG. 5 showing a two winding embodiment of the stator coils and a pair of oppositely poled half wave rectifier diodes for energizing the stator windings.

Referring now to FIG. 8 in conjunction with FIG. 7, two half wave rectifier diodes 126 and 128 are connected in series with the stator coils 20 and 22, respectively, and a source of alternating current potential. In a preferred embodiment, solid state rectifier diodes such as silicon diodes are used, however, any suitable diodes having a sufficient current carrying capacity to energize the stator coils 20 and and 22 may be employed.

In the embodiment shown in FIG. 8, each of the stator coils 20 and 22 includes two windings 20a and 20b, and 22a and 22b, respectively. A phase shifting capacitor 130 is connected in series with the windings 20b and 22b for shifting the phase of the current through the windings 20b and 22b with respect to the respective windings 20a and 22a. The aforementioned phase shift serves to increase the duty cycle of the current flowing through the stator coils 20 and 22 to thereby increase the power output of the reciprocating armature. Generally, the windings 20b and 22b will have fewer turns than the windings 20a and 22a, but the number of turns in each winding may be selected in accordance with the increase in power desired.

Operation is as follows. When a positive potential is applied to the junction of the diodes 126 and 128, the diode 128 is rendered conductive to cause current to flow through the stator coil 22. Due to the inductance of the winding 22a, the current through the winding 22a lags the voltage applied thereto. The capacitor 130 is connected in series with the winding 22b, and the capacitive reactance of the capacitor 130 tends to cancel the effects of the inductive reactance of the winding 22b. As a result, current begins to flow through the winding 22b sooner than through the winding 22a. Depending on the value of the capacitor 130, the current through the winding 22b can be made to lead or lag the alternating current voltage applied to the input terminals.

As the instantaneous voltage across the input terminals continues to build up during the first half cycle of the alternating current wave, the current through the stator coil 22 will also continue to build up, the build up of the current through the winding 22b following the voltage of the alternating current source more closely than the current through the winding 22a. As the instantaneous voltage of the alternating current source begins to decrease, the current through the winding 22b will begin to decrease. However, due to the inductive reactance of the winding 22a, the current through the winding 22a will continue to flow after the current flow through the winding 22b has ceased. As a result, a magnetic field is maintained within the coil 22 for a longer period of time than would be achieved with a single winding coil, the winding 22b providing the magnetic field at the beginning of the half cycle of the alternating current wave, and the winding 22a providing the magnetic field near the end of the half cycle.

After the first half of the alternating current cycle has been completed, the junction of the diodes 126 and 128 is rendered negative, thereby rendering the diode 128 nonconductive and the diode 126 conductive. When the diode 126 is rendered conductive on negative half cycles of the alternating current wave, the coil 20 is energized in a manner similar to the energization of the coil 22. When the coil 20 is energized, current flows initially through the winding 20b connected in series with the capacitor 130, and subsequently through the winding 20a, in a manner similar to the operation of the windings 22a and 22b. On positive half cycles the coil 22 is again energized, and the diodes 126 and 128 serve to alternately energize the coils 20 and 22 to cause the armature 42 to reciprocate at the alternating current rate.

In a preferred embodiment, when a source of alternating current is used to energize the stator coils 20 and 22, the coils are wound in opposite directions to maintain the direction of the magnetic field through the magnetic structure in the same direction. The maintenance of a unidirectional magnetic field reduces the hysteresis losses in the magnetic path and increases the output power of the motor for the reasons explained below. Referring to FIG. 7, the three pole pieces extending from the magnetic structure member 18 will be designated as 18a, 18b and 18c, and the three pole pieces extending from the magnetic pole member 16 will be designated as 16a, 16b and 16c. The coils 20 and 22 are wound such that the pole pieces 16a and 18a become south magnetic poles, and the pole pieces 16b and 18b become north magnetic poles when the coil 20 is energized. Similarly, the coil 22 is wound such that the pole pieces 16b and 18b become south magnetic poles and the pole pieces 16c and 18c become north magnetic poles when the coil 22 is enenrgized. As a result, the magnetic flux flowing through the magnetic structure 17 will always flow in the same direction.

As the coils are alternately energized, the armature 42 will be moved toward the energized coil as the magnetic field generated applies force to the armature in an effort to close the magnetic path around the energized coil. For example, when the coil 20 is energized, the armature 42 will be moved toward the pole pieces 16a and 18a in an effort to complete the magnetic path between the pole pieces 16a and 16b, and 18a and 18b. Conversely, as the coil 22 is energized, the armature 42 will be moved toward the pole pieces 16c and 18c. Accordingly, as the coils 20 and 22 are alternately energized, the armature 42 will reciprocate in synchronism with the energization of the coils.

In addition to the magnetic effects described above, the changing magnetic field flowing through the armature 42 causes current to be induced in the conductive induction rings 52 and 54. The current thus induced generates magnetic poles at opposing ends of the armature 42 in a direction opposite to the direction of the magnetic field produced by the coils 20 and 22. The magnetic poles thus generated at the opposing ends of the armature are alternately attracted to the poles 16a and 18a and 16c and 18c to further increase the output power of the reciprocating motor.

For example, when the armature is positioned as shown in FIG. 7 and the coil 22 is energized, the induced current flowing through the conductive induction ring 54 produces a south magnetic pole at the end of the armature positioned between the pole pieces 16b, 18b and 16c, 18c. The south pole thus generated is repelled away from the south pole generated at the pole pieces 16b and 18b and attracted toward the north pole at the pole pieces 16c and 18c. This action reinforces the magnetic forces attracting the armature 42 toward the pole pieces 16c and 18c. Similarly, when the coil 20 is energized, the current induced in the conductive induction ring 52 aids the forces attracting the armature 42 toward the pole pieces 16a and 18a.

Figure 9:
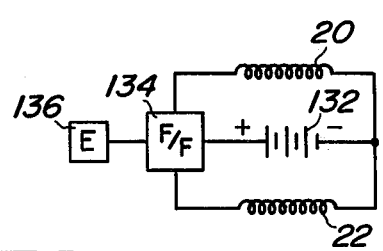
FIG. 9 is a schematic circuit diagram showing an alternative method for energizing the stator coils from a source of direct current potential and shows a single winding embodiment of the stator coils of FIG. 5.

The embodiments discussed in the foregoing have all utilized a source of alternating current potential to energize the reciprocating motor. The system may also be energized from a source of direct current potential if an appropriate switching arrangement for alternately energizing the coils 20 and 22 is provided. One such system is shown in FIG. 9. In the embodiment of FIG. 9, the coils 20 and 22 are energized by a battery 132 or other source of direct current potential. A flip-flop 134 is used to alternately connect one of the coils 20 and 22 to the battery 132 in response to a signal from an oscillator circuit 136. The flip-flop 134 may comprise a standard solid state flip-flop or a switching relay or the like. Any oscillator or astable multivibrator suitable for driving the flip-flop 134 may be used in the oscillator circuit 136. The frequency at which the flip-flop 134 is switched may be set at any desired frequency, depending on the desired frequency of reciprocation of the reciprocating motor. Because the pulse from the flip-flop 134 may be tailored to suit the particular reciprocating motor used, single winding coils may be used for the coils 20 and 22 if desired. However, due to the unidirectional voltage provided by the flip-flop, the coils 20 and 22 should be wound in the same direction if a unidirectional flux is desired in the magnetic structure.

Although particular embodiments of the invention have been illustrated, it should be noted that the illustrated embodiments are not intended to limit the scope of the invention, and that other embodiments and modifications occurring to those skilled in the art still fall within the scope and spirit of the invention as defined in the appended claims.

What is claimed is:

1. A reciprocating system comprising:
   an armature;
   means connected to opposing ends of said armature for supporting said armature for lateral movement over a predetermined range;
   first and second laterally displaced electromagnetic coils disposed about said armature, each of said first and second coils having first and second parallel windings alternate energization of said electromagnetic coils being effective to cause said armature to reciprocate;
   first and second unidirectional rectifying means each connected in a first series circuit with one of said first windings of a respective one of said first and second electromagnetic coils and in a second series circuit with the second winding of said respective one of said first and second electromagnetic coils for alternately energizing said first and second coils in response to an alternating current voltage applied thereto and;
   means for shifting the phase of the current through said second windings connected in series with each of said second windings and said first and second unidirectional rectifying means.

2. A reciprocating system as recited in claim 1 wherein said supporting means includes means for pumping fluids in response to the reciprocation of said armature.

3. A reciprocating system as recited in claim 1 wherein said first and second unidirectional rectifying means include first and second half wave rectifier diodes, respectively, said first half wave rectifier diode being connected to supply half wave rectified current to the first and second windings of said first electromagnetic coil, and said second half wave rectifier diode being connected to supply half wave rectified current to the first and second windings of said second electromagnetic coil, said first and second half wave rectifier diodes being poled in opposite directions for alternately supplying half wave rectified current pulses to said respective windings in response to said alternating current voltage.

4. A reciprocating system as recited in claim 3 wherein said phase shifting means includes a capacitor, and wherein each of said first windings is connected in one of said first series circuits with a respective one of said first and second half wave rectifier diodes, and each of said second windings is connected in one of said second series circuits with said capacitor and a respective one of said first and second half wave rectifier diodes.

5. A reciprocating system as recited in claim 3 wherein each of said coils is adapted for inducing magnetic flux into said armature, and said coils are wound in opposite directions for inducing a unidirectional flux into said armature.

6. A system as recited in claim 1 further including a conductive induction ring affixed to said reciprocating armature for reciprocation therewith, said induction ring being responsive to magnetic flux flowing therethrough for generating a circulating current therein.

7. A reciprocating system as recited in claim 1 further including:
   a housing having a base portion and an upper portion;
   a laminated magnetic structure member supported by said base portion;
   means for supporting said first and second laterally displaced coils within said housing in proximity to said laminated magnetic structure member for inducing a magnetic flux therein;
   means for securing said base portion to said upper portion; and
   means for supporting said pumping means at opposite ends of said housing.

8. A reciprocating system as recited in claim 7 further including a second laminated magnetic structure member supported within said upper portion of said housing.

9. A reciprocating system as recited in claim 8 wherein said pumping means includes a piston coupled to each opposing end of said armature, and said supporting means includes a tubular cylinder liner disposed over each piston, said cylinder liners being supported between said upper and said base portions of said housing at opposite ends thereof.

10. A reciprocating system as recited in claim 9 further including a carbon piston ring affixed to each of said pistons for reciprocation therewith.

11. A reciprocating system as recited in claim 8 wherein said pumping means includes a diaphragm coupled to each opposing end of said armature and a diaphragm chamber disposed over each diaphragm, and said supporting means includes means for securing said diaphragms and diaphragm chambers to opposite ends of said housing.

12. A reciprocating system comprising:
   first and second coaxially disposed and axially displaced stator coils each having first and second parallel windings;
   a magnetic armature mounted for reciprocation relative to said stator coils;
   a magnetic member cooperating with said stator coils and said armature to provide a magnetic path between said stator coils and said armature;
   means coupled to said first and second stator coils for energizing the windings in said first coil in alternation with the windings of said second coil; and
   means connected in circuit with the second windings of each of said first and second stator coils for shifting the phase of the current flowing through each of said second windings with respect to the current flowing through each of said respective first windings.

13. A reciprocating system as recited in claim 12 further including means connected to opposite ends of said armature for pumping fluids in response to the reciprocation of said armature.

14. A reciprocating system as recited in claim 12 wherein said phase shifting means includes a capacitor connected in two series circuits, each of said series circuits including said capacitor and one of said second windings.

15. A reciprocating system as recited in claim 14 wherein said alternate energizing means includes first and second oppositely poled rectifier diodes, said first rectifier diode being connected in a first series circuit with said first winding and in a second series circuit with said second winding of said first stator coil and said second rectifier diode being connected in a third series circuit with said first winding and in a fourth series circuit with said second winding of said second stator coil.

16. A reciprocating system as recited in claim 1 wherein said first and second coils each include first and second parallel windings.

17. A reciprocating system as recited in claim 16 further including first and second bobbins for supporting said first and second electromagnetic coils, said first and second windings of said first coil being wound on said first bobbin and said first and second windings of said second coil being wound on said second bobbin.

18. A reciprocating system as recited in claim 12 further including a pair of conductive induction rings disposed at opposite ends of said armature, said induction rings being responsive to the flow of magnetic flux therethrough for generating a circulating current therein.

* * * * *

PO-1050
(5/69)

UNITED STATES PATENT OFFICE
CERTIFICATE OF CORRECTION

Patent No. 3,931,554　　　　　　　Dated　January 6, 1976

Inventor(s)　Nikolaos E. Spentzas

It is certified that error appears in the above-identified patent and that said Letters Patent are hereby corrected as shown below:

Title page, Item [76], change inventor's name from
"Nikolaos E. Spentzas" to
--Nick E. Spentzas--.

Signed and Sealed this fifteenth Day of June 1976

[SEAL]

Attest:

RUTH C. MASON
Attesting Officer

C. MARSHALL DANN
Commissioner of Patents and Trademarks